March 25, 1958 — B. C. WHITE — 2,828,036
TILTABLE BED TRAILER
Filed March 9, 1953 — 2 Sheets-Sheet 1
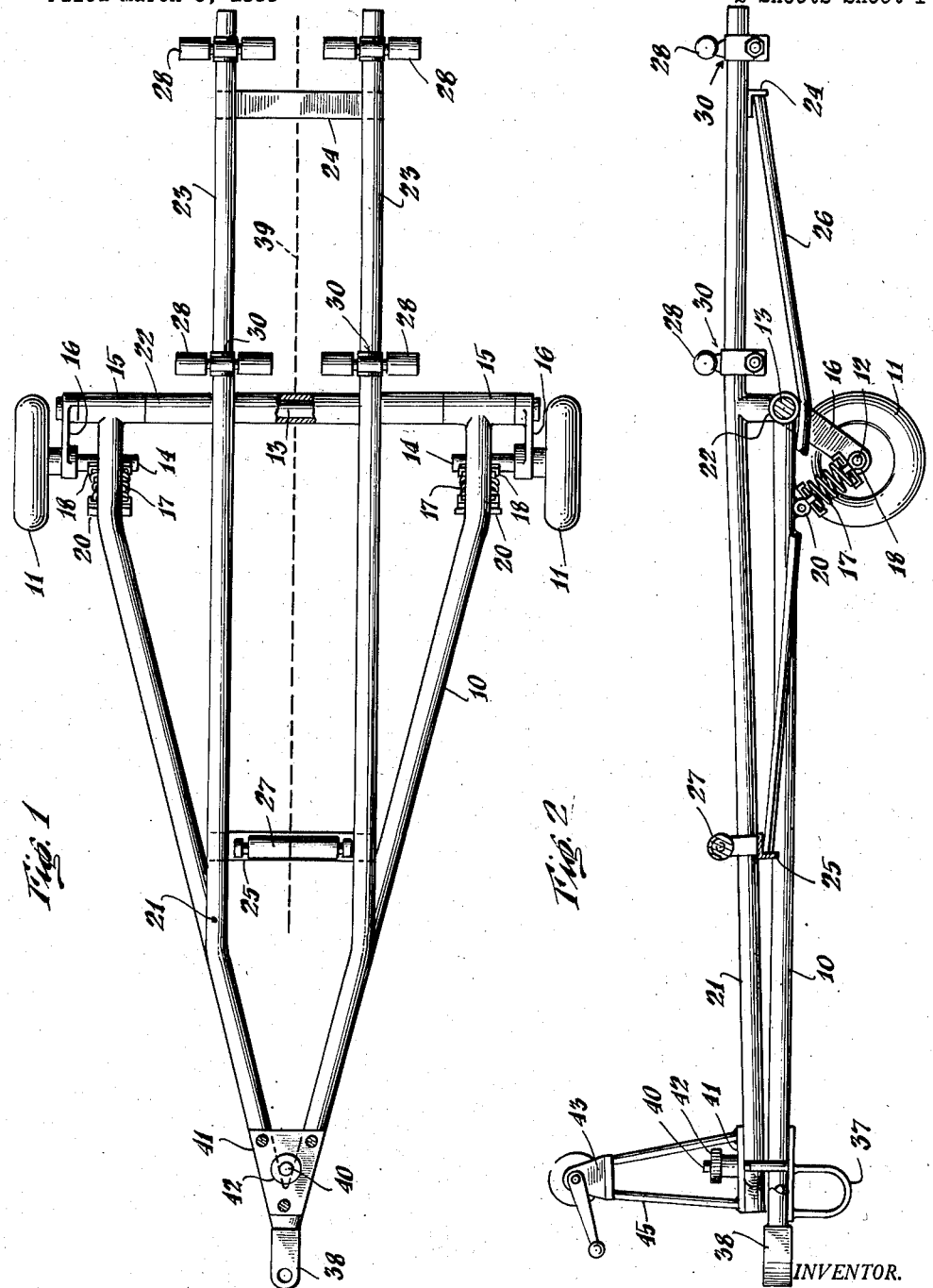
INVENTOR.
Benjamin C. White
BY
ATTORNEY March 25, 1958 — B. C. WHITE — 2,828,036
TILTABLE BED TRAILER
Filed March 9, 1953 — 2 Sheets-Sheet 2
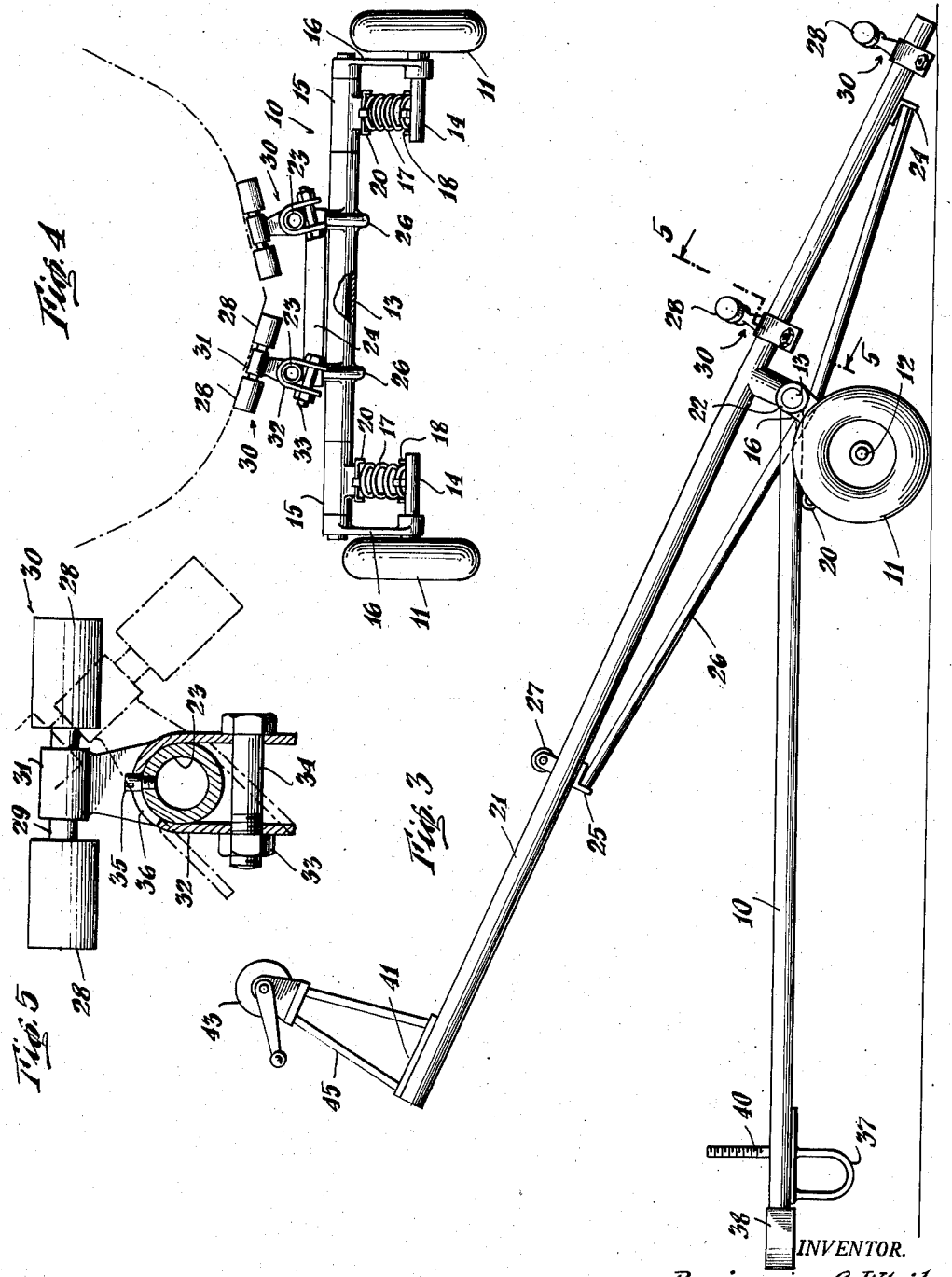
INVENTOR.
Benjamin C. White
BY
ATTORNEY United States Patent Office 2,828,036
Patented Mar. 25, 1958

2,828,036

TILTABLE BED TRAILER

Benjamin C. White, Conewango Township, Warren County, Pa., assignor to Leon T. Wolchik, Albion Borough, Erie County, Pa.

Application March 9, 1953, Serial No. 341,243

6 Claims. (Cl. 214—505)

This invention relates to trailers of the type used for carrying boats and other loads along highways attached to trucks, automobiles or tractors and more particularly to a novel type of boat trailer having a tiltable load-supporting bed with rollers mounted in the bed to assist in the loading and unloading of the boat.

Various types of trailers have been employed for carrying boats and other loads, such trailers being detachably connected to an automobile or tractor. In some cases roller means have been provided on trailers, particularly near the rear of the trailer to assist in drawing the load on to the trailer and also to assist in its removal from the trailer. Also frequently trailers have been provided with winches or other means to assist in drawing a load on to the trailer. It has been suggested that the entire frame of the trailer may be tipped up to assist in the drawing of the load aboard the trailer. However, in order to tilt the entire frame of the trailer, the front portion, which is normally connected to the automobile must be disconnected and if the load is extremely heavy, such as a boat in the range of 500 to 1000 pounds, it would require considerable effort to control the trailer and at the same time tilt it to a desired angle in order to draw the boat on to the frame of the trailer.

In the loading of boats, it has frequently been necessary to push the trailer into the water in a shallow area and float the boat into position in fixed cradles on the frame of the trailer and then draw the boat and trailer out of the water. This is not desirable because the submersion of the wheels, axles and associated parts of the running gear of the trailer tends to damage and rust the parts, particularly if the water is salty. Further, if the sea-bottom is sandy, considerable difficulty may be encountered in beaching the trailer and boat, for as the two are pulled out of the water the full load is shifted to the wheels which must bear the weight across the sandy bottom.

An object of the present invention is to provide a boat trailer which can load and unload boats in the water without the necessity of submerging the wheels.

A further object of the invention is to provide means by which the boat trailer may remain connected to an automobile or tractor and at the same time the bed of the trailer may be tilted to a desired position for loading or unloading.

A still further object of the invention is to provide roller means which will support the outside of the hull of the boat at several points without injury to said outside surface, and which will properly center the boat on the trailer, and prevent it from tipping while being loaded, unloaded, and, while being carried on the trailer.

Other and further objects will be apparent from disclosure which follows.

The invention comprises in general, a boat trailer having a frame member and road engageable wheels connected to the frame. A tiltable bed or body member is pivotally mounted on the frame and can be tilted with respect to the frame. Roller means are mounted on said tiltable bed for the purpose of making rolling and supporting contact with a boat or other load which is to be drawn on the trailer. At least some of the roller means are mounted in roller assemblies which are pivotally mounted to the tiltable bed to permit angular adjustment of the axes of such roller means so that the rollers may adjust to the contour of a boat hull as the boat is pulled on board the trailer and such contour changes.

For a more detailed description of the invention reference is made to the drawings wherein:

Figure 1 is a plan view of a boat trailer embodying the features of the invention.

Fig. 2 is a side view thereof with parts cut away to show details.

Fig. 3 is another side view of the invention with the tiltable bed of the trailer in a tilted position.

Fig. 4 is an end view of the trailer showing the supporting rollers in rolling contact with a boat; the rollers having adjusted to the contour of the boat, and Fig. 5 is a detail of a roller assembly, as taken along the line 5—5 in Fig. 3, showing the manner of mounting on the tilting bed.

Referring to the drawings, the trailer shown includes a frame member 10. A dead axle 13 is mounted rotatably in collar members 15 of the frame 10. Wheels 11, with suitable pneumatic or other, are rotatably mounted on stub axles 12. The dead axle 13 and the stub axles 12 are connected by link members 16 so that in effect the stub axles and link members form bell cranks on the opposite ends of the dead axle 13. Springs 17 are pivotally connected to bearing sleeve 14, on the stub axles, at 18, and to the frame 10 at 20, as best shown in Figs. 2 and 4.

A tiltable bed assembly 21 is pivotally mounted on the dead axle 13 between the collar members 15, the sleeve 22 fixed to the tiltable bed 21 being rotatably mounted on the dead axle 13. The positional relationship of the link members 16, the collar members 15 and the sleeve 22 of the tiltable bed are best shown in Figs. 1 and 4. The frame of the tiltable bed which comprises longitudinal members 23, and spacer members 24, 25 may also include braces 26. The braces spacer members and the longitudinal members may be made of suitably rigid material such as steel pipe or steel angle pieces. The tiltable bed assembly may be fixed to the sleeve member 22 as by welding, as indicated in Fig. 4.

Roller members 27 and 28 may be mounted for rolling and supporting engagement with a boat or other load to be carried on the trailer. The roller 27 may be mounted as shown on the forward spacer 25 to engage the keel of the boat as it moves toward the forward end of the tiltable bed 21. The roller members 28 are supported on roller assemblies 30 mounted on the longitudinal elements 23 of the tiltable bed. As shown in Figs. 4 and 5, each of the roller assemblies 30 consist of coaxially mounted rollers 28 which are carried on an axle 29 rotatably supported on centrally disposed bearing means 31. The bearing 31 is fixed to a yoke member 32 which is pivotally mounted on one of the members 23 and is held thereon by a nut 33 and a bolt 34. Each yoke loosely engages one of the longitudinal elements 23 so that the angle of the axis of the rollers 28 supported by that yoke may be shifted to fit the contour of the boat. A projecting member such as a screw or bolt 35 may be fixed in the longitudinal member 23, as best shown in Fig. 5 and a slot 36 may be provided in the curved portion of the yoke 32 through which the bolt 35 may project. By suitably arranging the bolt 35 with regard to the slot and also by limiting the length of the slot it is possible to limit the pivoting movement of the rollers so that they will not pivot completely around the longitudinal members 23 but will stay in a generally upright position, as shown in the drawings, so as to be available when a boat is to be drawn onto the trailer. It has been found that if the slot in the roller assemblies 30 and the projection in the longitudinal members are arranged to permit the axes of the rollers to shift from horizontal, as shown in full line in Fig. 5, to about 45° from the horizontal, as shown in broken line, toward the longitudinal center 39 (shown in broken line in Fig. 1) of the tiltable bed that such adjustment is as much as is generally required with a boat having the usual contours.

At the front of the trailer frame a rest member 37 and the usual coupling element 38 may be provided. In addition a bolt 40, as best shown in Fig. 3, may be attached to the frame 10 and a suitable opening may be provided in front plate 41 in the tiltable bed 21 to receive the bolt 40. A nut 42 may be threaded on the bolt to maintain the tiltable bed 21 and the frame 10 in the substantially parallel horizontal position shown in Fig. 2. When it is desired to tilt the bed 21, the nut 42 may be removed from the bolt and the end of the bed 21 adjacent the plate 41 may be lifted upward to a position such as shown in Fig. 3. A winch 43 may be mounted at the forward end of the tiltable bed 21 on a suitable support such as stand 45.

In operation, in order to draw a boat or other load on to the trailer, the latter is backed into position adjacent the boat or load and the bed 21 is tilted to a position such as shown in Fig. 3. The line from the winch is attached to the bow of the boat and the winch is operated to draw the boat toward the forward end of the tilted bed. In the case of a boat, as it is drawn on to the tilted bed 21 it engages the rearmost rollers 28 with the forward part of the hull. These rollers, when not in use, ordinarily are at the extreme angle to the horizontal permitted by the slots 36 and projections 35, for example at 45° from horizontal toward the center of the tilted bed. Frequently the bow of the boat has a steep angular contour and therefore the rollers have very little adjustment to make to the contour of the boat. As the boat is pulled on to the bed, the angle of the axes of rear rollers 28 continue to adjust to the surface of the boat and the other rollers 28 spaced inward from the rear also adjust themselves to the contour of the boat. The adjustments as achieved by the action of the boat surfaces for the roller assemblies are freely adjustable within their limits. The boat is pulled forward until the bow is adjacent the winch 43. As the bow nears the front end of the tiltable bed 21, it reaches a point of equilibrium with respect to the pivot on the dead axle 13 so that the bed 21 may be readily returned to the horizontal position, shown in Fig. 2. Suitable known tie means may be used to secure the boat against shifting while in transit.

In ordinary circumstances, it is unnecessary to uncouple the frame 10 from the truck, tractor or automobile to which it is attached and, therefore, the frame and wheels of the trailer are maintained in a fixed position so that the person operating the winch is free to stand on the frame and operate the winch without at the same time exerting effort to maintain the trailer in a fixed position.

With the apparatus of this invention it has been found possible to draw a boat out of the water without backing the wheels of the trailer into the water. This is partly due to the fact that the trailer of this invention can be provided with a tiltable bed which extends some distance to the rear of the axle and proper balance can thereby be achieved as the boat is pulled on to the tiltable bed.

It has been found possible, with the use of this tiltable bed type trailer, for one person to load and unload boats weighing between 500 and 1000 pounds. This would not be possible with the type of trailers previously known for even when such trailers were provided with one or more keel rollers more than one person would be required to maintain the boat upright on an even keel and centered on the trailer and also additional help would be needed to lift the boat into position on the fixed cradles in such trailers. If the boat surfaces were permitted to slidably engage the fixed cradles of prior trailers during loading and unloading operations, the friction of such sliding engagement would require the exertion of a greater amount of effort to load the boat and would also result in damage to the painted surface. By providing rollers 28 spaced from the longitudinal center 39 of the bed 21 in the rear portion of the trailer the rollers engage the bottom of the boat on both sides of its keel and thereby provide a rolling cradle-like support for the boat. The rollers also act to center the boat on the tiltable bed and prevent it from tipping over as it is being loaded or unloaded. Furthermore, when the boat is in the loaded position, the rollers act as cradles for the boat and thereby eliminate the necessity for additional fixed cradles on the trailer during the time when the boat is loaded and is being transported.

The rollers may be covered with a soft rubber or similar cushioning material which prevents damage to the surface of the boat and the rolling contact of such rollers prevents any scraping of the paint on the hull of the boat. It has been found desirable to mount the rollers 28 on axles with central bearings 31 as best shown in Figs. 1, 4 and 5 so that there will not be any protruding supporting brackets at the ends of the rollers which might contact and mar the boat when the boat is initially received by said rollers before such rollers had angularly adjusted themselves to the contour of the boat. The rollers 28 are mounted at corresponding spaced positions on the longitudinal members 23 of the bed 21 so that they are in juxtaposition and cooperate in supporting the boat on both sides of the keel, as shown in Fig. 4.

The mounting of the wheels on the stub axles with the links 16, and the resilient supporting of the wheels by the springs 17 in spaced relation to the frame 10 provides a desirable knee action for the trailer. The links 16 may be rigidly fixed to the dead axle 13 so that in the event that one spring 17 is disabled or one of the tires of the wheels 11 becomes flat, the trailer may be supported by the other of such wheels and springs for the brief period necessary until the damage can be repaired. Such arrangement will prevent the possibility of the boat and trailer turning over because of the disabling of one of the wheels. It will be appreciated however, that the links 16 may also be pivotally mounted on the dead axle 13 whereby each wheel assembly is free to effect its own independent knee action.

It has been found that boats may be loaded and unloaded when the level of the water is as much as four or five feet below the trailer for the tiltable bed may be tilted as much as 90° from the horizontal. This feature permits the launching and loading of boats from docks and sea walls or bulk-heads, whereas previous trailers could only be used on a gently sloping beach.

It will be appreciated from the foregoing that this invention, as disclosed in the apparatus described, achieves the objects of providing a boat trailer which can unload and load a boat without requiring that the running gear of the trailer be submerged in the water and it also achieves the object of providing a means whereby a boat may be loaded on a trailer without detaching the trailer from the automobile or other tractor to which it is coupled and that a boat can be loaded and unloaded without marring the paint on the hull and without danger of its tipping during such loading operation. This last object is achieved by the provision of the rollers which are freely adjustable to the contour of the boat.

In accordance with the provisions of the patent statutes, the operation of the invention has been described, together with the elements which are now considered the best embodiment thereof but it should be understood that the structure disclosed is only illustrative and the invention may be carried out by other means. Also, while it is designed to use the various features and elements in the combinations and relations described some of these may be altered and modified without interfering with the more general results outlined.

I claim:

1. A boat trailer comprising a frame member, means positioned at one end of said frame member for securement thereof to a towing vehicle, road engageable wheels connected to said frame member and longitudinally spaced from said means for securement to said towing vehicle, a tiltable bed member pivotally mounted on said frame member at the end thereof remote from said securing means, and a first pair and a second pair of rollers rotatably mounted on said bed member for rolling and supporting engagement with the outside of a boat being pulled aboard said trailer, said first pair of rollers being longitudinally spaced from said second pair along said tiltable bed member, the axis of each roller of said first pair of rollers being inclined relative to the axis of said second pair of rollers whereby said rollers of each said pair provide a trough for receiving the curved bottom of said boat.

2. The boat trailer of claim 1, wherein the wheels are mounted on separate stub axles connected by link members to another axle mounted in the frame.

3. The boat trailer of claim 1, wherein the wheels are mounted on separate stub axles connected by link members to another axle which in turn is pivotally mounted in the frame; said link members being fixed to said other axle and, spring means connected to the stub axles and the frame for maintaining the wheels in resilient spaced relationship to said frame.

4. A trailer comprising a frame, means positioned at one end of said frame for securement thereof to a vehicle, wheels connected to the frame for supporting the trailer, a tiltable bed pivotally mounted on the frame at the end thereof remote from the securing means, said bed including spaced longitudinal members, roller means, means for supporting the roller means for rotation about their respective axes, the supporting means being disposed on the longitudinal members with the axes of the roller means transverse to the longitudinal members, said supporting means being pivotally mounted on the longitudinal members for permitting free adjustment of the angle of the axis of each of the roller means with respect to horizontal.

5. A boat trailer comprising a frame member, means positioned at one end of said frame member for securing said frame member to a vehicle, road engaging wheels connected to said frame member at the end thereof remote from said securing means, a tiltable bed member being pivoted to said frame member at a point intermediate the ends of said bed member, said tiltable bed member extending forwardly and rearwardly from said pivotal connection to said frame member a substantial distance, roller means on said bed member for rolling and supporting engagement with the outside of a boat being pulled aboard said trailer, said wheels being connected to said trailer by means of an axle extending transversely of said frame member, links pivotally connected to said axle and extending downwardly and forwardly therefrom, stub axles attached to the lower end of said links, and springs engaging said stub axles at the lower ends thereof and said frame member at the upper end thereof at a point spaced forward of the connection of said frame member to said tiltable member, said wheels being supported on said stub axles.

6. The boat trailer recited in claim 5 wherein said bed member and said frame member have tubular members attached thereto in alignment with each other, said first mentioned axle extends through said tubular members, and said links are supported on said first mentioned axle.

References Cited in the file of this patent

UNITED STATES PATENTS

| | | |
|---|---|---|
| 1,870,573 | Kuchar | Aug. 9, 1932 |
| 2,217,871 | Lindgren | Oct. 15, 1940 |
| 2,485,793 | Vassar | Oct. 25, 1949 |
| 2,554,398 | Brei | May 22, 1951 |
| 2,557,203 | Rehberger | June 19, 1951 |
| 2,608,314 | Krider | Aug. 26, 1952 |
| 2,636,745 | Cartwright | Apr. 28, 1953 |
| 2,650,730 | Rohm | Sept. 1, 1953 |
| 2,676,716 | Sallis | Apr. 27, 1954 |
| 2,708,045 | Shontz | May 10, 1955 |
| 2,733,823 | Evans | Feb. 7, 1956 |